(12) United States Patent
Post

(10) Patent No.: US 6,657,344 B2
(45) Date of Patent: Dec. 2, 2003

(54) PASSIVE MAGNETIC BEARING FOR A HORIZONTAL SHAFT

(75) Inventor: Richard F. Post, Walnut Creek, CA (US)

(73) Assignee: The Regents of the University of California, Oakland, CA (US)

( * ) Notice: Subject to any disclaimer, the term of this patent is extended or adjusted under 35 U.S.C. 154(b) by 66 days.

(21) Appl. No.: 09/946,257

(22) Filed: Sep. 5, 2001

(65) Prior Publication Data

US 2003/0042812 A1 Mar. 6, 2003

(51) Int. Cl.⁷ ................................................ H02K 7/09
(52) U.S. Cl. ...................................................... 310/90.5
(58) Field of Search .......................... 310/90.5, 90, 166

(56) References Cited

U.S. PATENT DOCUMENTS

| | | | | |
|---|---|---|---|---|
| 3,845,997 A | * | 11/1974 | Boden et al. | 310/90.5 |
| 4,726,640 A | * | 2/1988 | Iwama et al. | 359/200 |
| 5,495,221 A | | 2/1996 | Post | 335/299 |
| 5,561,335 A | | 10/1996 | Dunfield et al. | |
| 5,686,772 A | * | 11/1997 | Delamare et al. | 310/90.5 |
| 6,111,332 A | | 8/2000 | Post | 310/90.5 |
| 6,384,500 B1 | * | 5/2002 | Chassoulier et al. | 310/90.5 |

OTHER PUBLICATIONS

K. Halbach Application of Permanent Magnets in Accelerators and Electron Storage Rings, Journal of Applied Physics, vol. 57, Apr.; 15. 1985, pp. 3605–3608.

* cited by examiner

Primary Examiner—Dang Le
(74) Attorney, Agent, or Firm—James Tak; Alan H. Thompson

(57) ABSTRACT

A passive magnetic bearing is composed of a levitation element and a restorative element. The levitation element is composed of a pair of stationary arcuate ferromagnetic segments located within an annular radial-field magnet array. The magnet array is attached to the inner circumference of a hollow shaft end. An attractive force between the arcuate segments and the magnet array acts vertically to levitate the shaft, and also in a horizontal transverse direction to center the shaft.

The restorative element is comprised of an annular Halbach array of magnets and a stationary annular circuit array located within the Halbach array. The Halbach array is attached to the inner circumference of the hollow shaft end. A repulsive force between the Halbach array and the circuit array increases inversely to the radial space between them, and thus acts to restore the shaft to its equilibrium axis of rotation when it is displaced therefrom.

19 Claims, 3 Drawing Sheets

PASSIVE MAGNETIC BEARING FOR A HORIZONTAL SHAFT

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to passive magnet bearings and, more particularly, to using such bearings to support a rotating shaft having a horizontal axis of rotation.

2. Description of Related Art

Motor and generator armatures, flywheel rotors, and other rotatable components have conventionally been supported and constrained against transverse and axial movement by mechanical bearings, such as journal bearings, ball bearings, and roller bearings. Such bearings necessarily involve mechanical contact between the rotating element and the bearing components, leading to well-known problems associated with friction and wear. Even non-contacting bearings, such as air bearings, involve frictional losses that can be appreciable, and are also sensitive to dust particles. In addition, mechanical bearings, and especially air bearings, are poorly adapted for use in a vacuum.

The use of magnetic forces to provide a non-contact, low-friction bearing avoids the drawbacks attendant to mechanical and air bearings, and thus provides an attractive alternative. However, magnetic bearings and suspension elements are subject to the constraints of Earnshaw's Theorem which, as applied to magnetic apparatus, holds that any magnetic suspension element, such as a magnetic bearing that utilizes static magnetic forces between a stationary and a rotating component, cannot exist in a state of equilibrium against external forces, e.g., gravity. In other words if such a bearing element is designed to be stable against transverse displacements, it will be unstable against axially directed displacements, and vice versa. The assumptions implicit in the derivation of Earnshaw's Theorem are that the magnetic fields are static in nature, i.e., that they arise from either fixed currents or objects of fixed magnetization, and that diamagnetic bodies are excluded.

As a consequence, magnetic bearings are designed to be stable along at least one axis, for example, their axis of symmetry, and then external stabilizing means are used to ensure their stability along the remaining axes. The stabilizing means referred to could either be mechanical, i.e., ball bearings, or, more commonly, electromagnetic. The latter approach uses position sensors to detect incipient unstable motion of the rotating element and magnetic coils in conjunction with electronic servo amplifiers to provide stabilizing forces to restore the element to its (otherwise unstable) position of force equilibrium. The foregoing is usually designated as an "active" magnetic bearing, in reference to the active involvement of electronic feedback circuitry in maintaining stability.

Less common than the servo-controlled magnetic bearings just described are magnetic bearings that use superconductors to provide a repelling force acting against a permanent magnet element in such a way as to levitate that magnet. These bearing types utilize the flux-excluding property of superconductors to attain a stable state by properly shaping the superconductor and the magnet in order to provide restoring forces for displacements in any direction from the position of force equilibrium. Needless to say, magnetic bearings that employ superconductors are subject to the limitations imposed by the need to maintain the superconductor at cryogenic temperatures, as well as limitations on the magnitude of the forces that they can exert.

As may be seen from the foregoing, there presently exists a need in the art for a bearing that is magnetic, yet overcomes the limitations of Earnshaw's Theorem without the drawbacks and limitations attendant to active or superconducting magnetic bearings. The present invention fulfills this need in the art.

SUMMARY OF THE INVENTION

Briefly, the present invention is a passive magnetic bearing composed of two elements, one to levitate a horizontal shaft, and the other to restore the shaft to its equilibrium position if it is displaced transverse to its axial axis of rotation. The levitation element is composed of a pair of arcuate segments composed of ferromagnetic material located within an annular radial-field magnet array. The magnet array is attached to the shaft's inner circumference and rotates with the shaft. The arcuate segments remain stationary with respect to the shaft. The magnetic field of the radial-field magnet array generates an attractive force between the arcuate ferromagnetic segments and the magnet array. The arcuate segments are positioned so that this attractive force is directed vertically to levitate the shaft, and also in a horizontal transverse direction to center the shaft.

The restorative element is composed of an annular Halbach array and an annular circuit array located concentrically within the Halbach array. The Halbach array is attached to the shaft's inner circumference, and rotates with the shaft. The circuit array remains stationary relative to the shaft. There is a repulsive force between the Halbach array and the circuit array that is induced when the Halbach array rotates relative to the circuit array. The repulsive force increases exponentially with a decrease in the radial space between the Halbach array and the circuit array, and thus acts to restore the shaft to its equilibrium axis of rotation whenever the shaft is transversely displaced therefrom.

In summary, one element of the bearing levitates and centers the shaft, while the other element restores the shaft to its equilibrium axis of rotation in the event it is displaced transversely therefrom.

DETAILED DESCRIPTION OF THE INVENTION

Figure 1:
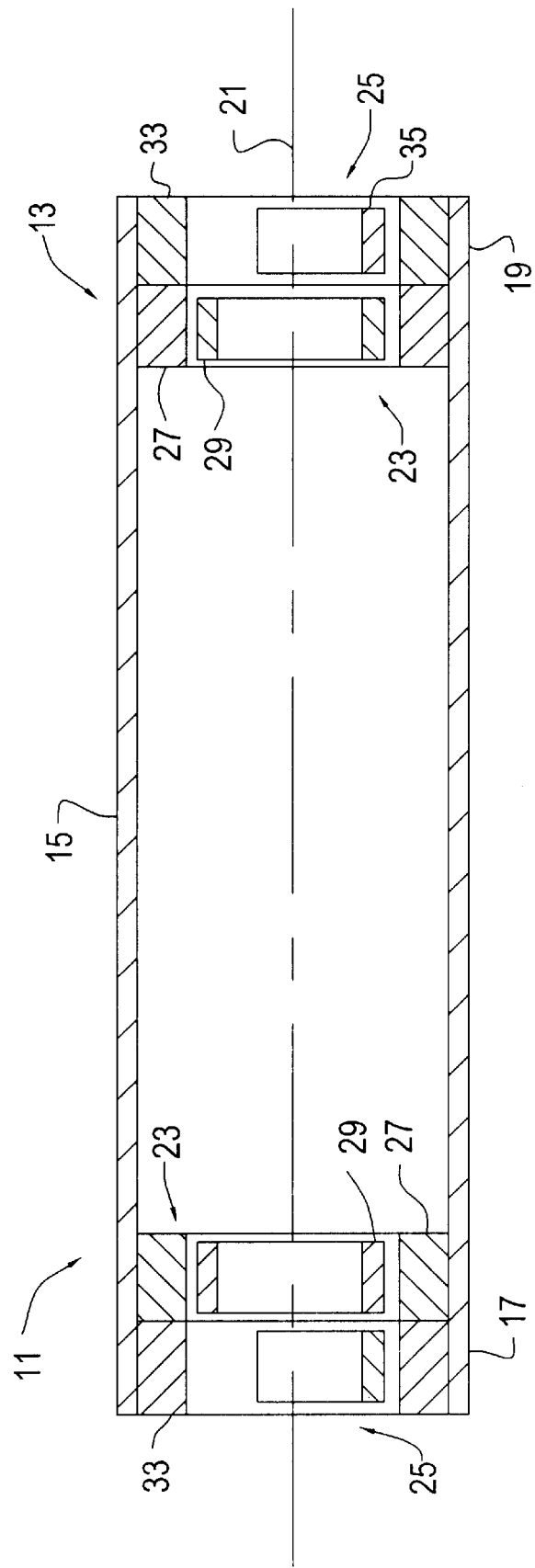
FIG. 1 is a cross section side view of a rotatable shaft supported at each end by a passive magnetic bearing of the present invention.

Turning to the drawings, FIG. 1 shows passive magnetic bearings 11 and 13 of the present invention, supporting rotatable hollow shaft 15 at shaft ends 17 and 19, respectively. Bearings 11 and 13 provide shaft 15 with freedom of rotation about axial axis of rotation 21 of shaft 15. Shaft 15 is a simplification used herein because the primary purpose of this discussion is to explain the structure and operation of the passive magnetic bearing of the present invention. In actuality, shaft 15 is representative of most any structure which requires a rotational degree of freedom about a horizontal axis, e.g., a flywheel rotor or generator armature.

Figure 2:
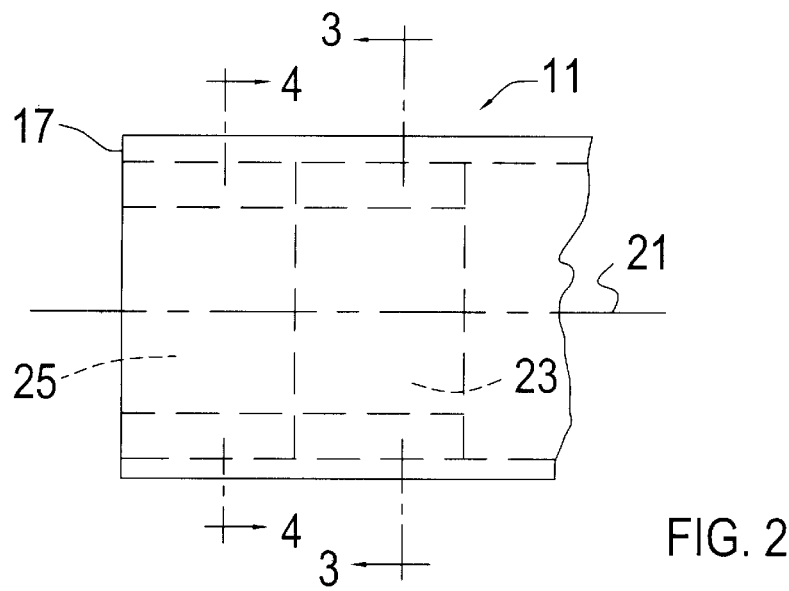
FIG. 2 is a side view of the passive magnetic bearing of the present invention.

FIG. 2 shows a side view of bearing 11 and shaft end 17. Bearing 11 includes bearing elements 23 and 25, which lie inside of shaft 15 and are adjacent to each other. Bearing 13 is identical to bearing 11, and the structural relationship between bearing 13 and shaft end 19 is the same as that between bearing 11 and shaft end 17, as hereinafter described.

Figures 3, 4:
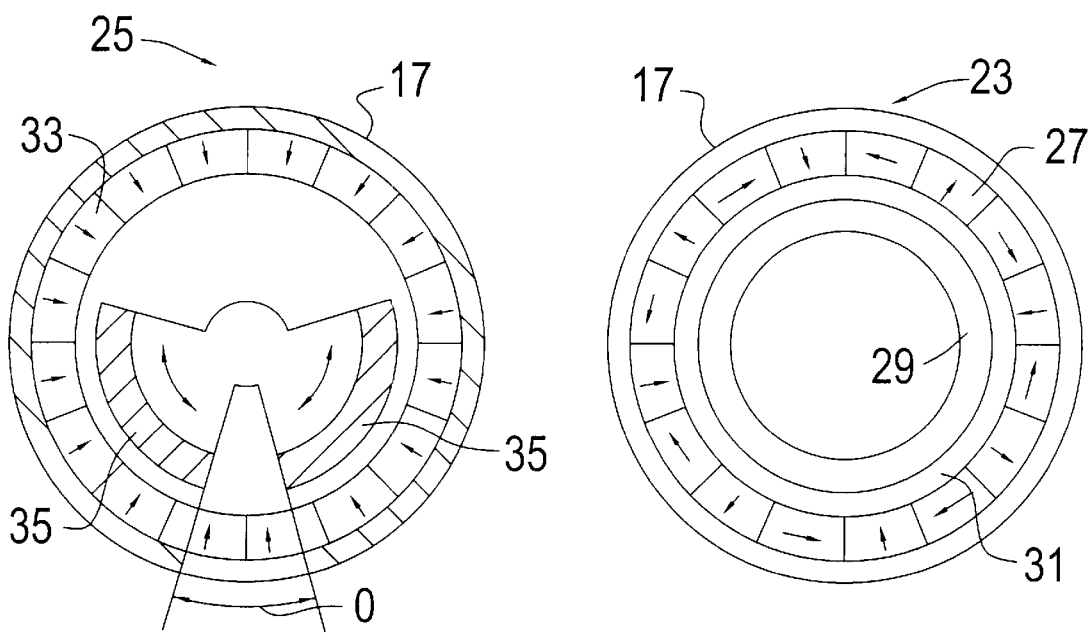
FIG. 3 is a cross section view taken along line 3—3 of FIG. 2, that shows the restoring bearing element comprised of a rotatable annular Halbach magnet array and a concentric array of stationary close-packed shorted circuits.
FIG. 4 is a cross section view taken along line 4—4 of FIG. 2, that shows the levitating bearing element comprised of a rotatable annular radial-field magnet array and a stationary concentric pair of arcuate segments composed of ferromagnetic material.

FIG. 3 provides a cross section view of element 23, taken along line 3—3 of FIG. 2. Element 23 is comprised of Halbach magnet array 27 and close-packed array of shorted circuits 29. Halbach array 27 is an annular array of permanent magnets concentric within shaft 15. The outer circumference of Halbach array 27 is attached to the inner circumference of shaft end 17, and Halbach array 27 thus rotates with shaft 15 about axial axis 21. Halbach array 27 is composed of individual permanent magnets, each of which is particularly oriented with respect to axial axis 21 so that the array, as a whole, generates a reinforced multiple-pole magnetic field within the volume circumscribed by the array, yet cancels out most of the magnetic field that might otherwise occur outside of the array. A discussion of Halbach magnet arrays is provided in K. Halbach, "Application of Permanent Magnets in Accelerators and Electron Storage Rings," *Journal of Applied Physics, Vol.* 57, Apr. 15, 1985, pp. 3605–3608, which is hereby incorporated by reference.

Circuit array 29 is a close-packed array of shorted, electrically conductive circuits attached to a rigid support structure (not shown) through the open end of shaft end 17. Circuit array 29 is symmetrically disposed about the axis of equilibrium for shaft 15; that is, when shaft 15 is rotating in its equilibrium position, axial centerline 21 is collinear with the axis of equilibrium. This is the position shown in the drawings. Circuit array 29 lies within Halbach array 27. Shaft 15 and Halbach array 27 rotate with respect to circuit array 29. Variable separation distance 31 separates Halbach array 27 and circuit array 29. Shaft 15 can be vertically displaced from its equilibrium axis and, when that occurs, Halbach array 27 and axial axis 21 will translate with respect to circuit array 29, resulting in an asymmetrical separation distance 31.

As described in U.S. Pat. No. 5,495,221 issued to Richard F. Post, the present inventor, and hereby incorporated by reference, rotation of Halbach array 27 relative to circuit array 29 provides a stabilizing centering force on rotating shaft 15. More particularly, the relative rotation of Halbach array 27 about circuit array 29 induces a current in circuit array 29 that ultimately generates a repulsive magnetic force acting across separation distance 31. This repulsive force increases as distance 31 decreases, and lessens as distance 31 increases, e.g., diametrically opposite the minimum value for distance 31. The effect is to restore axial axis 21 of rotating shaft 15 to its undisturbed, equilibrium position whenever a force acts on shaft 15 transverse to axial axis 21.

FIG. 4 shows a section view of bearing element 25 of bearing 11, taken along line 4—4 of FIG. 2. Bearing element 25 includes radial-field magnet array 33 and a pair of arcuate segments 35. Array 33 is an annular array of permanent magnetic bars that is attached to the inner circumference of shaft end 17 and thus rotates about axis 21 with shaft 15. The magnets composing array 33 are oriented so that their magnetic fields point radially inward towards axial axis 21.

Arcuate segments 35 lie within array 33. Segments 35 are comprised of ferromagnetic material, e.g., ferrite material or "transformer iron" laminated to reduce eddy currents. Alternatively, segments 35 may be comprised of permanent magnet bars oriented so as to produce a radial magnetic field of polarity such as to be attracted to radial-field magnet array 33. Segments 35 are separated by the angle θ, and oriented to attract magnet array 33. Segments 35 are attached to a rigid support structure (not shown) through the open end of shaft end 17, and thus remain fixed relative to the axis of equilibrium for shaft 15, i.e., axial as 21 and magnet array 33 can translate with respect to segments 35, and magnet array 33 can also rotate with respect to segments 35.

The attraction between segments 35 and the proximate magnets of array 33 provides both a levitating force and a horizontal centering force acting on shaft 15. By adjusting the angle θ, the levitating, i.e., vertical, component of the attractive force can be adjusted to approximate ½ the combined weight of shaft 15, Halbach array 27, magnet array 33, and any additional load associated with the use of bearing 11. The levitating force generated by bearing 13 can be similarly adjusted, so that bearing elements 11 and 13 combine to levitate the weight of shaft 15 in addition to the weights of Halbach arrays 27, magnet arrays 33 for bearings 11 and 13, respectively, and any additional load associated with the use of bearings 11 and 13.

Figure 5:
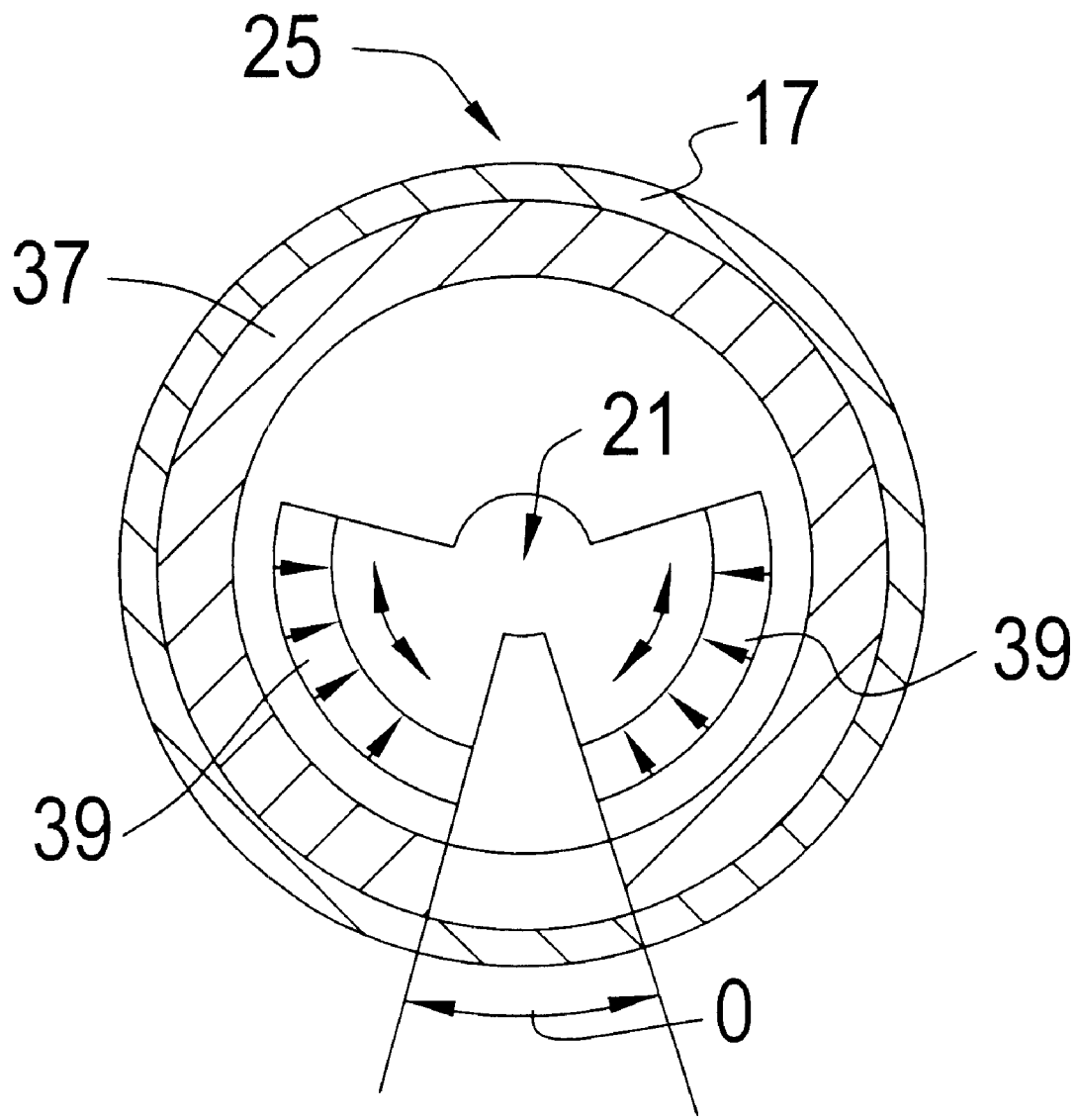
FIG. 5 shows an alternative embodiment of the levitating bearing element comprised of a rotatable cylinder composed of ferromagnetic material and a stationary concentric pair of arcuate segments composed of radial-field magnets.

FIG. 5 shows an alternative embodiment for bearing element 25, wherein rotatable cylinder 37 is composed of a ferromagnetic material and concentric stationary arcuate segments 39 are composed of a pair of arcuate radial-field magnets. The attraction between cylinder 37 and arcuate segments 39 provides both a levitating force and a horizontal centering force acting on shaft end 17. By adjusting the angle θ separating arcuate magnets 39, the vertical component of the attractive force can be appropriately adjusted, as previously discussed in conjunction with the aforementioned embodiment of bearing element 25.

The support system composed of passive magnetic bearings 11 and 13 thus acts to restore axial axis 21 of rotating shaft 15 to its undisturbed, equilibrium position whenever a force acts on shaft 15 transverse to axial axis 21, in addition to levitating and centering shaft 15. Bearings 11 and 13 thus allow shaft 15 to rotate without mechanical friction about axial axis 21.

It should be noted that while the levitating and centering force of bearing element 25 is present even when shaft 15 is not rotating, the restorative centering force of bearing element 23 will be generated only when Halbach array 27 is rotating relative to circuit array 29 at or above a critical angular velocity. Thus a conventional touchdown bearing (not shown) to support shaft 15 is necessary if it is anticipated or possible that a transverse force might act on shaft 15 while it is not rotating, or rotating at less than the critical angular velocity.

It is to be understood, of course, that the foregoing description relates only to embodiments of the invention, and that modification to these embodiments may be made without departing from the spirit and scope of the invention as set forth in the following claims.

What is claimed is:

1. A passive magnetic bearing for providing a rotational degree of freedom for an object about an axial axis comprising:

a restoring element including:
- a multiple-pole Halbach array attached to the object;
- an array of shorted, electrically conductive circuits separated from the Halbach array by a variable distance; and
- a magnetic repelling force repelling the Halbach array from the circuit array, being induced by rotation of the Halbach array relative to the circuit array, and being inversely related to the distance; and a levitating element including
- an annular member attached to the object,
- an arcuate member and
- a magnetic attracting force attracting the annular member to the arcuate member, whereby
  - the axial axis is placed in an equilibrium position by the levitating element, and restored to the equilibrium position by the restoring element when displaced from the equilibrium position.

2. The magnetic bearing defined in claim 1 wherein the circuit array and the arcuate member are stationary with respect to the equilibrium position.

3. The magnetic bearing defined in claim 1 wherein: the attracting force has a levitating component that opposes a gravitational field, and a centering component lying normal to the gravitational field.

4. The magnetic bearing defined in claim 3 wherein:
the arcuate member is comprised of two arcuate segments separated by an angle; and
the levitating component is a function of the angle, whereby
the angle is adjusted to levitate the object to an equilibrium height relative to a horizontal reference plane.

5. The magnetic bearing defined in claim 4 wherein:
the angle is adjusted by rotating the arcuate segments about a first axis; and
the first axis is collinear with the axial axis when the object is in the equilibrium position.

6. The magnetic bearing defined in claim 4 wherein:
the shaft is hollow and has an inner circumference; and
the Halbach array and the annular member are attached to the inner circumference.

7. The magnetic bearing defined in claim 6 wherein the shaft is a part of a flywheel rotor.

8. The magnetic bearing defined in claim 4 wherein:
the arcuate segments are composed of a ferromagnetic material; and
the annular member is comprised of an array of permanent magnets.

9. The magnetic bearing defined in claim 4 wherein:
each of the arcuate segments is a permanent magnet; and
the annular member is composed of a ferromagnetic material.

10. The magnetic bearing defined in claim 4 wherein:
each of the arcuate segments is a permanent magnet; and
the annular member is comprised of an array of permanent magnets.

11. An apparatus for providing an object with a rotational degree of freedom about an axis comprising:

first and second means for generating a mutually attractive force between them;
the attractive force tending to position the object in an equilibrium position;
third and forth means for generating a mutually repulsive force between them, with the repulsive force varying inversely to a separation distance separating the third and fourth means;
the repulsive force tending to restore the object to the equilibrium position when the object is displaced from the equilibrium position; and
the first and third means being attached to the object,
the attractive force including a vertical component that opposes a gravitational field;
the object having a mass; and further comprising
means for adjusting the vertical component, whereby the equilibrium position can be maintained independent of the mass.

12. The bearing apparatus as defined in claim 11 wherein the attractive force includes a horizontal component that lies normal to the gravitational field.

13. The bearing apparatus as defined in claim 12 wherein the axis is horizontal when the object is In the equilibrium position.

14. The bearing apparatus as defined in claim 11 wherein:
the second means is comprises of two arcuate segments separated by an angle; and
the adjusting means includes means for changing the angle.

15. The bearing apparatus as defined in claim 11 wherein:
the first means includes an annular array of magnets generating a radial magnetic field;
the second means includes an arcuate segment positioned within the annular array of magnets;
the third means is a Halbach array of magnets; and
the fourth means is an annular array of conductive circuits positioned within the Halbach array of magnets.

16. The bearing apparatus as defined in claim 15 wherein the repulsive force is induced by rotation of the Halbach array of magnets about the array of conductive circuits.

17. The bearing apparatus as defined in claim 15 wherein the arcuate segment is composed of a ferromagnetic material.

18. The bearing apparatus as defined in claim 15 wherein the arcuate segment is composed of a magnet.

19. The bearing apparatus as defined in claim 11 wherein:
the first means includes a ferromagnetic material having an annular shape;
the second means includes an arcuate magnet positioned within the annular array of magnets;
the third means is a Halbach array of magnets; and
the fourth means is an annular array of conductive circuits positioned within the Halbach array of magnets.

* * * * *